United States Patent
Noguchi et al.

(10) Patent No.: US 8,594,361 B2
(45) Date of Patent: Nov. 26, 2013

(54) SPEAKER MOUNTING MEMBER FOR DISPLAY APPARATUS

(75) Inventors: Satoshi Noguchi, Kanagawa (JP); Takahisa Tagami, Kanagawa (JP); Emiko Ikeda, Tokyo (JP); Hiroshi Iki, Kanagawa (JP)

(73) Assignee: Sony Corporation, Tokyo (JP)

( * ) Notice: Subject to any disclaimer, the term of this patent is extended or adjusted under 35 U.S.C. 154(b) by 487 days.

(21) Appl. No.: 12/690,181

(22) Filed: Jan. 20, 2010

(65) Prior Publication Data

US 2010/0183186 A1 Jul. 22, 2010

(30) Foreign Application Priority Data

Jan. 22, 2009 (JP) ................................. 2009-012277
Mar. 17, 2009 (JP) ................................. 2009-065147

(51) Int. Cl.
*H04R 1/02* (2006.01)
*H04R 9/06* (2006.01)

(52) U.S. Cl.
USPC .............. 381/388; 381/87; 381/333; 381/386

(58) Field of Classification Search
USPC .................................... 381/388, 87, 333, 386
See application file for complete search history.

(56) References Cited

U.S. PATENT DOCUMENTS

| | | | |
|---|---|---|---|
| 2005/0146251 A1 | 7/2005 | Gillengerten | |
| 2008/0304693 A1* | 12/2008 | Lau ............................... | 381/388 |

FOREIGN PATENT DOCUMENTS

| | | |
|---|---|---|
| CN | 201 098 678 | 8/2008 |
| JP | 60-037986 U | 3/1985 |
| JP | 07-177592 | 7/1995 |
| JP | 11-272196 A | 10/1999 |
| JP | 2000-216553 A | 8/2000 |
| JP | 2001-034178 A | 2/2001 |
| JP | 3079045 U | 5/2001 |
| JP | 2002-268578 | 9/2002 |
| JP | 2002-268578 A | 9/2002 |
| JP | 2003-259249 | 9/2003 |
| JP | 2004-211365 A | 7/2004 |
| JP | 2006-162187 A | 6/2006 |
| JP | 2008-052133 A | 3/2008 |
| JP | 2008-109382 | 5/2008 |
| JP | 2008-109382 A | 5/2008 |
| WO | WO 2008/150320 A1 | 12/2008 |

OTHER PUBLICATIONS

[No Author Listed], Sanus Systems XAS1A, Product Manual. 2007. 8 pages.
Instruction Manual for the Xas1A Sanus System, 2007.

* cited by examiner

*Primary Examiner* — Duc Nguyen
*Assistant Examiner* — Matthew Eason
(74) *Attorney, Agent, or Firm* — Wolf, Greenfield & Sacks, P.C.

(57) ABSTRACT

A speaker mounting member for a display apparatus including:
  one or plurality of mounting plates configured to be laid on a back surface of a display apparatus;
  a linking member configured to be crosswise linked to the mounting plate at a predetermined position in a first direction along a longitudinal direction of the mounting plate;
  a movable member configured to be linked to the linking member movably along a second direction perpendicular to the first direction; and
  a speaker mounting panel configured to be attached to the movable member and to be able to mount a speaker.

9 Claims, 12 Drawing Sheets

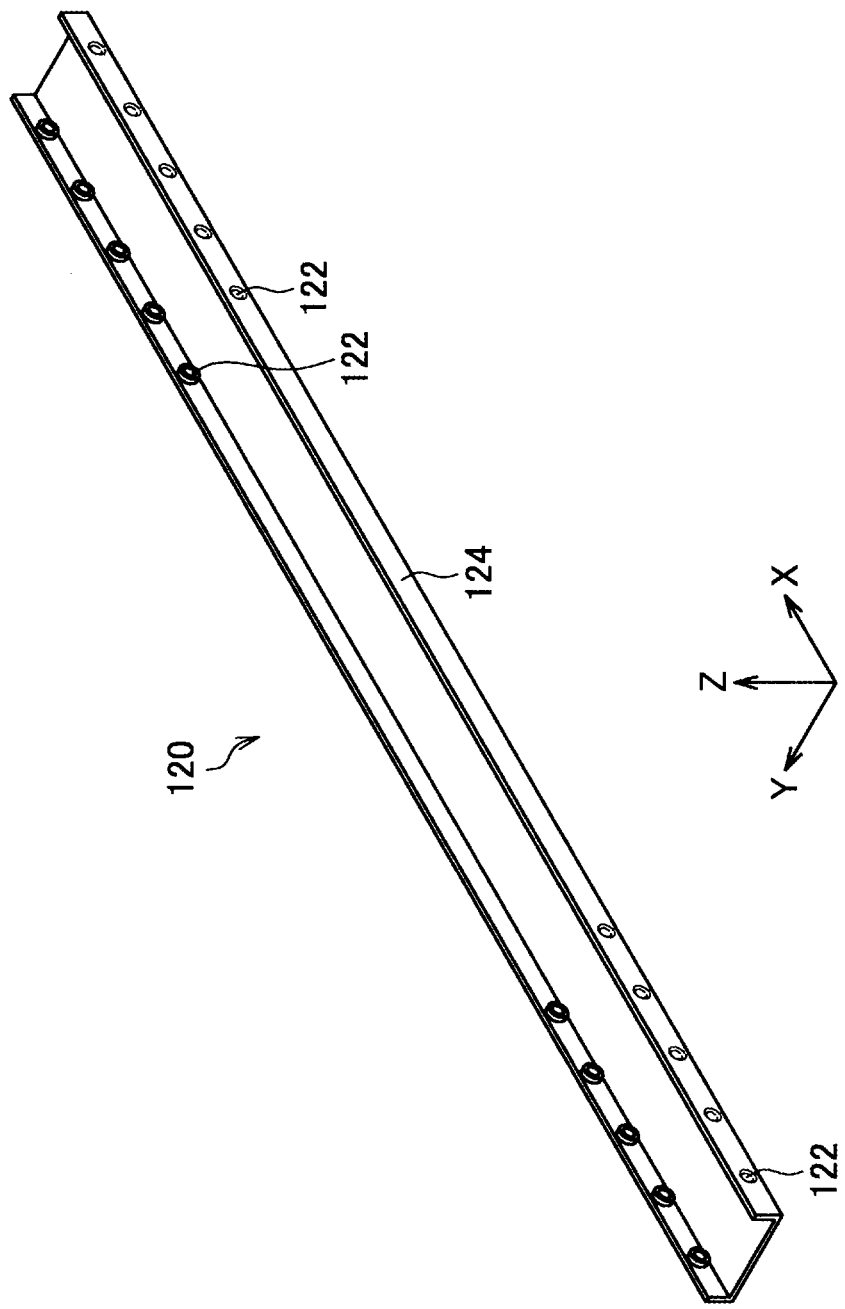

SPEAKER MOUNTING MEMBER FOR DISPLAY APPARATUS

BACKGROUND OF THE INVENTION

1. Field of the Invention

The present invention relates to a speaker mounting member for a display apparatus.

2. Description of the Related Art

In recent years, display apparatuses of television receivers or the like have become highly functional. The display apparatus uses a speaker to output audio. For example, Japanese Patent Application Laid-Open No. 2008-109382 discloses a technique in which external speakers are mounted on both sides of display apparatus. In addition, the display apparatuses have become thinner. As the display apparatuses have become thinner, they can be hung and mounted on a wall. On the other hand, a user can also set a thinned display apparatus on a base or the like in a manner in related art, so that the user can choose various setting methods in accordance with his or her own preference. A technique of a wall-hanging member for a display apparatus for hanging and using a display apparatus on a wall as described above is disclosed, for example, in Japanese Patent Application Laid-Open No. 2002-268578.

Also, Japanese Patent Application Laid-Open No. 2002-268578 discloses a technique of a speaker mounting member for a display apparatus in which the above described wall-hanging member for a display apparatus and a mounting bracket for mounting an external speaker are integrated.

SUMMARY OF THE INVENTION

However, the speaker mounting member for a display apparatus as described above is unique for each display apparatus, and is difficult to be used for a display apparatus having a different size or the like. In other words, a different speaker mounting member for a display apparatus has to be prepared for each display apparatus having a different size.

In addition, a wall-hanging member for a display apparatus which need not be removed and attached again even when a display apparatus is hung on a wall or an external speaker is mounted to be used is desired.

Even if a wall-hanging member for a display apparatus can be attached to a different display, when it is attached to the different display, connector terminals, cables, and the like on the back of display apparatus may be cumbersome.

There is a case in which the speaker mounting member is seen between the display apparatus and a speaker. Further, there is an issue in which the speaker may extremely protrude from the display apparatus or retract to the back of the display apparatus, so that the speaker is difficult to be mounted in accordance with user's visual preference.

In light of the foregoing, it is desirable to provide a novel and improved speaker mounting member for a display apparatus which can be applied to different display apparatuses, need not be removed and attached again even when various mounting methods are employed, has adjustable mounting positions in accordance with positions of connector terminals or the like, and can mount a speaker in accordance with user's visual preference.

According to an embodiment of the present invention, there is provided a speaker mounting member for a display apparatus including: one or plurality of mounting plates configured to be laid on a back surface of a display apparatus; a linking member configured to be crosswise linked to the mounting plate at a predetermined position in a first direction along a longitudinal direction of the mounting plate; a movable member configured to be linked to the linking member movably along a second direction perpendicular to the first direction; and a speaker mounting panel configured to be attached to the movable member and to be able to mount a speaker.

The speaker mounting member may further include a fixing member configured to fix a position of the movable member by sandwiching the movable member with the linking member.

The mounting plate may include a plurality of engaging portions arranged in the first direction, and the linking member may engage with the engaging portion of a predetermined position along the second direction.

The movable member may include a guide groove formed along the second direction, the fixing member may be arranged along the second direction and may include a plurality of through-holes into which guide members guiding a movement of the movable member penetrate, and the guide members penetrating into the plurality of through-holes may engage with the guide groove.

The fixing member may include a flat surface, and when a wall-hanging member including a hook section configured to hook and fix the display apparatus on a wall and a wall-hanging main body having a second flat surface is fixed to the mounting plate, the first flat surface and the second flat surface may contact each other.

The speaker mounting panel may be formed of a transparent material.

The speaker mounting panel may be attachable to both surfaces of the movable member in a third direction perpendicular to both the first direction and the second direction.

The speaker mounting member may further include a panel position adjustment member arranged between the movable member and the speaker mounting panel.

The fixing member may include a contact portion contacting at least the movable member, and the contact portion may be formed to protrude to the movable member.

As described above, according to an embodiment of the present invention, a speaker mounting method is possible in which the speaker mounting member need not be removed and attached again depending on each usage even when various mounting methods are employed, the mounting position of the speaker mounting member is adjustable in accordance with positions of connector terminals or the like, and the speaker can be mounted in accordance with user's visual preference.

BRIEF DESCRIPTION OF THE DRAWINGS

FIG. 7 is an illustration for explaining a linking member included in the speaker mounting member for a display apparatus according to the first embodiment;

DETAILED DESCRIPTION OF THE EMBODIMENTS

Figure 1:
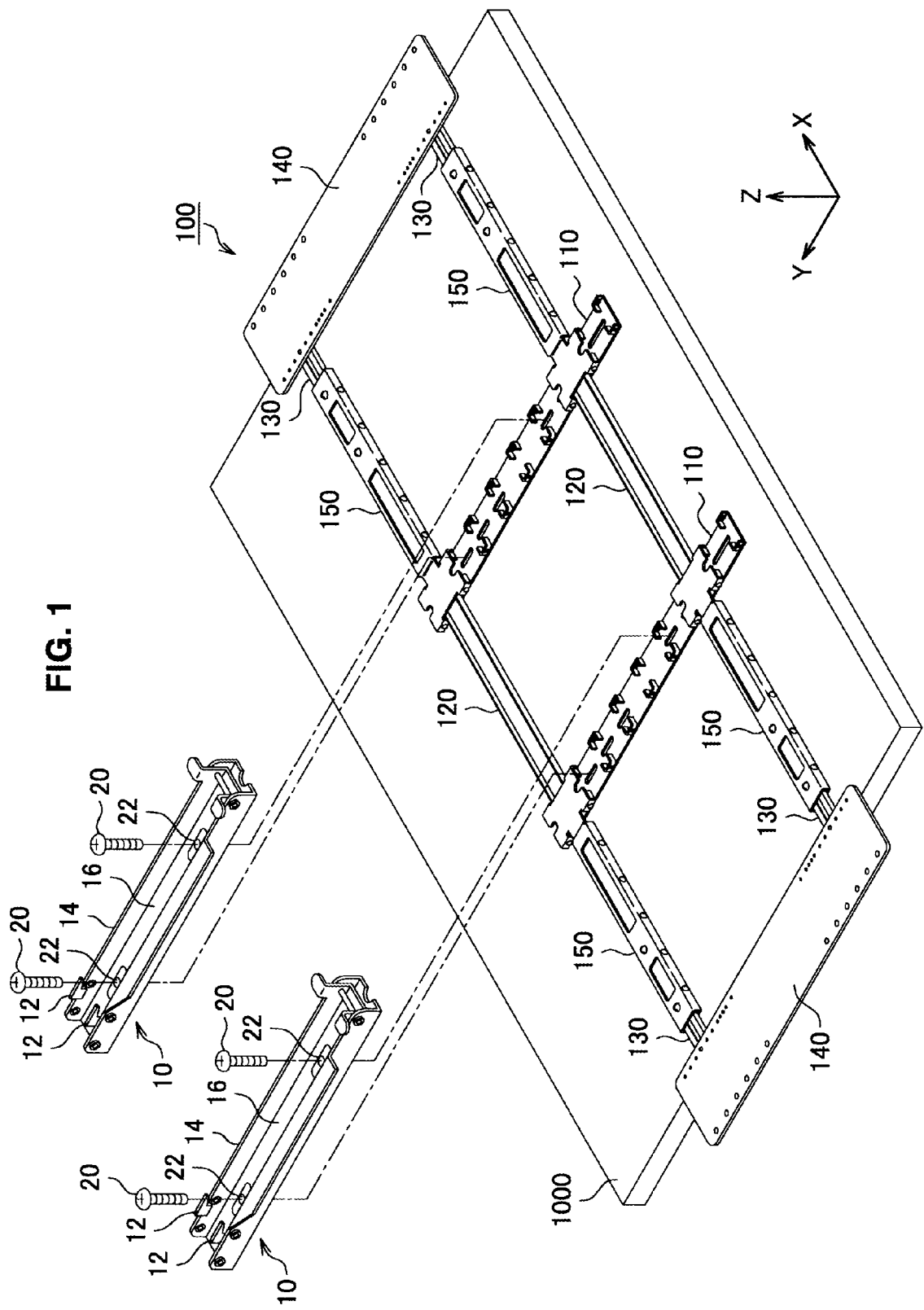
FIG. 1 is an illustration for explaining a speaker mounting member for a display apparatus according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

[Flow of Description]

The flow of the description is as follows. First, with reference to FIGS. 1 to 3, a speaker mounting member for a display apparatus according to an embodiment of the present invention will be described. Next, each member included in the speaker mounting member for a display apparatus according to the embodiment will be described with reference to FIGS. 4 to 10D. Finally, a technical idea of the embodiment will be summarized, and operational effects obtained from the technical idea will be briefly described. The order of description is as follows:

1. Speaker mounting member 100 for display apparatus
2. Members in the speaker mounting member 100 for display apparatus
3. Summary <1. Speaker Mounting Member 100 for Display Apparatus>

[Example of a Display Apparatus 1000 to which the Speaker Mounting Member 100 for Display Apparatus is Attached]

First, the speaker mounting member 100 for a display apparatus attached to a display apparatus 1000 will be described with reference to FIG. 1. FIG. 1 is an illustration showing a back surface of the display apparatus 1000 to which the speaker mounting member 100 for a display apparatus is attached. The speaker mounting member 100 for a display apparatus includes a mounting plate 110, a linking member 120, a movable member 130, a speaker mounting panel 140, and a fixing member 150.

The mounting plate 110 is formed into a plate shape having a generally rectangular shape. For example, two mounting plates 110 are arranged on the back surface of the display apparatus 1000 so that the longitudinal direction of the mounting plates 110 is in parallel to Y direction. Here, the Y direction is the height direction of the display apparatus 1000. The X direction is the width direction of the display apparatus 1000. The Z direction is the depth direction of the display apparatus 1000. While the mounting plate 110 will be described below with reference to FIG. 4, the mounting plates 110 includes a plurality of protrusion portions and engaging portions arranged in the Y direction, and the linking member 120 engages with a predetermined engaging portion. In other words, the linking member 120 can engage with one of the plurality of engaging portions arranged in the Y direction. Therefore, the arrangement position of the linking member 120 in the Y direction can be adjusted.

Two linking members 120 are arranged crossing the mounting plates 110 on the back surface of the display apparatus 1000. Each linking member 120 crosses two mounting plates 110. While the linking plate 120 will be described below with reference to FIG. 7, the linking plate 120 has a squared U-shaped cross-section in the YZ plane, and is formed to be elongated in the X direction. In other words, the linking member 120 is arranged so that its longitudinal direction is in parallel to the X direction. An opening portion of the squared U-shape of the linking member 120 faces a wall.

The two linking members 120 are linked to the mounting plate 110 so that the mounting positions of the linking members 120 can be adjusted in the Y direction. Therefore, the positions of the linking members 120 are adjusted in accordance with positions of connector terminals and cables (not shown in the figures) on the back surface of the display apparatus 1000. As a result, the linking members 120 are mounted avoiding the connector terminals or the like. In the illustration shown in FIG. 1, a part of the linking member 120 is covered with the fixing member 150. The part covered with the fixing member 150 in the linking member 120 and a part where the linking member 120 is linked to the mounting plate 110 will be described below with reference to FIG. 8.

The movable member 130 is preferred to have a generally rectangular solid shape, and is formed into a tube shape having a hollow in the X direction. Four movable members 130 are arranged on the back surface of the display apparatus 1000 so that the longitudinal direction of the movable members 130 is in parallel to X direction. Two movable members 130 are arranged on each linking member 120 at both ends of the linking member 120 in the X direction. While the movable member 130 will be described below with reference to FIGS. 6A and 6B, each of the four movable members 130 is covered with a different fixing member 150. A part where the movable member 130 is covered with the fixing member 150 will be described below with reference to FIG. 8. The movable member 130 is linked to the linking member 120 movably in the X direction while being covered with the fixing member 150. A part where the movable member 130 is specifically linked to the linking member 120 will be described below with reference to FIG. 8. Since both the movable member 130 and the linking member 120 have a hollow interior, for example, they can accommodate wiring such as a connection cable or used for a speaker as the connection cable passes through them, so that cable entanglement can be avoided.

The speaker mounting panel 140 is preferred to be formed into a plate shape having a generally rectangular solid shape. The speaker mounting panel 140 is positioned at an X direction edge of the display apparatus 1000. A speaker (not shown in the figures) is mounted on the speaker mounting panel 140. While the speaker mounting panel 140 will be described below with reference to FIGS. 10A, 10B, 10C, and 10D, the speaker mounting panel 140 is attached to an end of the movable member 130 opposite to the end linked to the linking member 120 in the X direction. As described above, since the movable member 130 is mounted on the linking member 120 movably in the X direction, the speaker mounting panel 140 can be positionally adjusted in the X direction. Therefore, the speaker (not shown in the figures) can be arranged in various positions in accordance with the size of the display apparatus 1000 and the user's preference.

Figure 2:
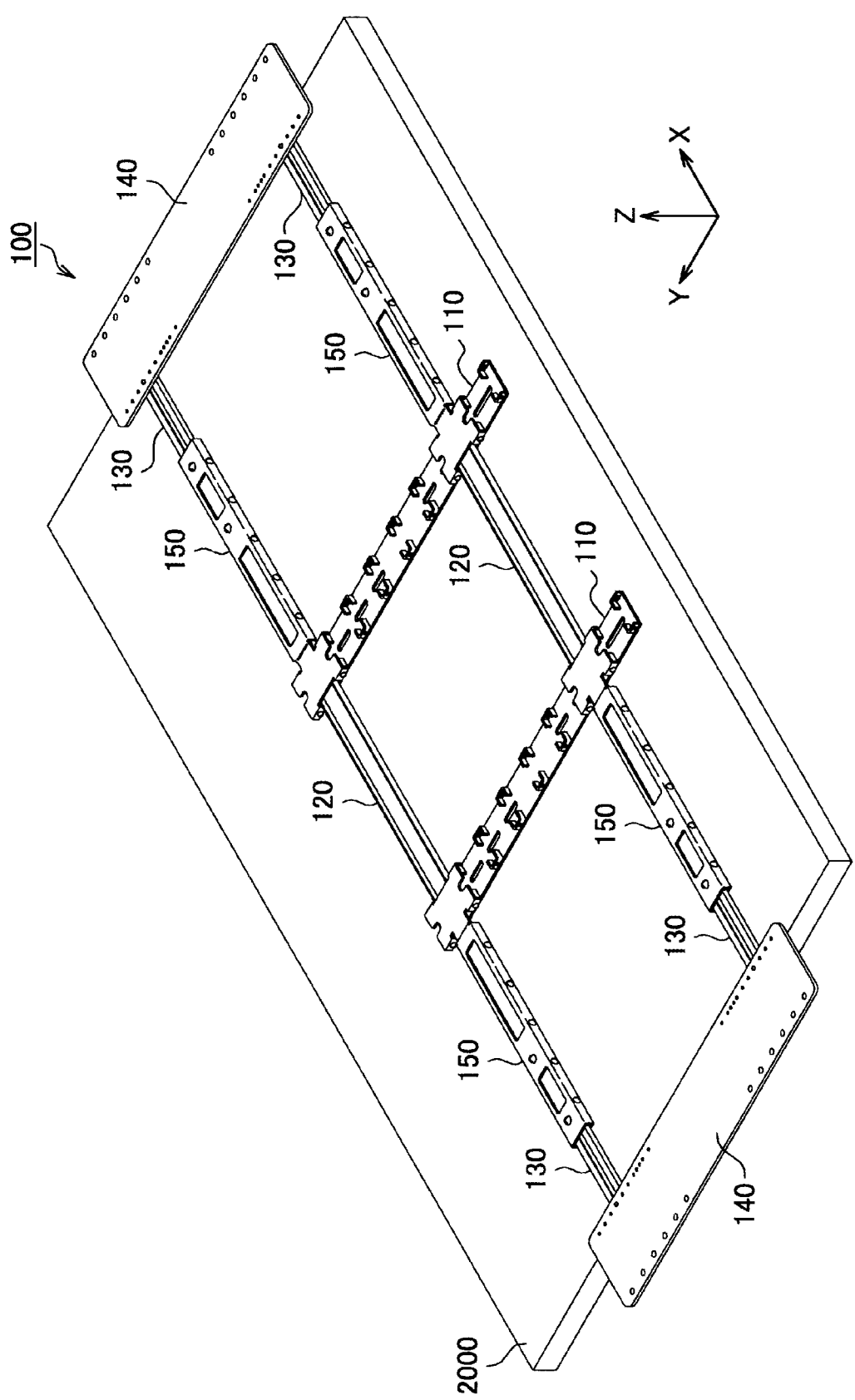
FIG. 2 is an illustration for explaining the speaker mounting member for a display apparatus according to the first embodiment.

Here, with reference to FIG. 2, a condition will be described in which the speaker mounting member 100 for a display apparatus is attached to a display apparatus 2000 having a different size from that of the display apparatus 1000 described in FIG. 1. FIG. 2 is an illustration showing a back surface of the display apparatus 2000 to which the speaker mounting member 100 for a display apparatus is attached.

The description is based on an assumption that the size of the display apparatus 2000 shown in FIG. 2 is larger than the size of the display apparatus 1000 described in FIG. 1. When attaching the speaker mounting member 100 for a display apparatus to the display apparatus 2000, the speaker mounting member 100 for a display apparatus has to be more elongated in the X direction compared with the speaker mounting member 100 for a display apparatus attached to the display apparatus 1000 shown in FIG. 1. In this case, as shown in FIG. 2, the length of the speaker mounting member 100 for a display apparatus can be elongated by moving each movable member 130 in the X direction with reference to the linking member 120 and fixing the movable members 130. In other words, the adjustment of the length from the end of the fixing member 150 in the X direction to the speaker mounting panel 140 can be performed by adjusting the length of the movable member 130. As a result, a speaker can be mounted on even the display apparatus 2000 having a different size by using the speaker mounting member 100 for a display apparatus according to the embodiment. In other words, a user can use the speaker mounting member 100 for a display apparatus for a display apparatus of any size. The position adjustment method using the above movable member 130 will be described below with reference to FIG. 8 or the like.

Figure 3:
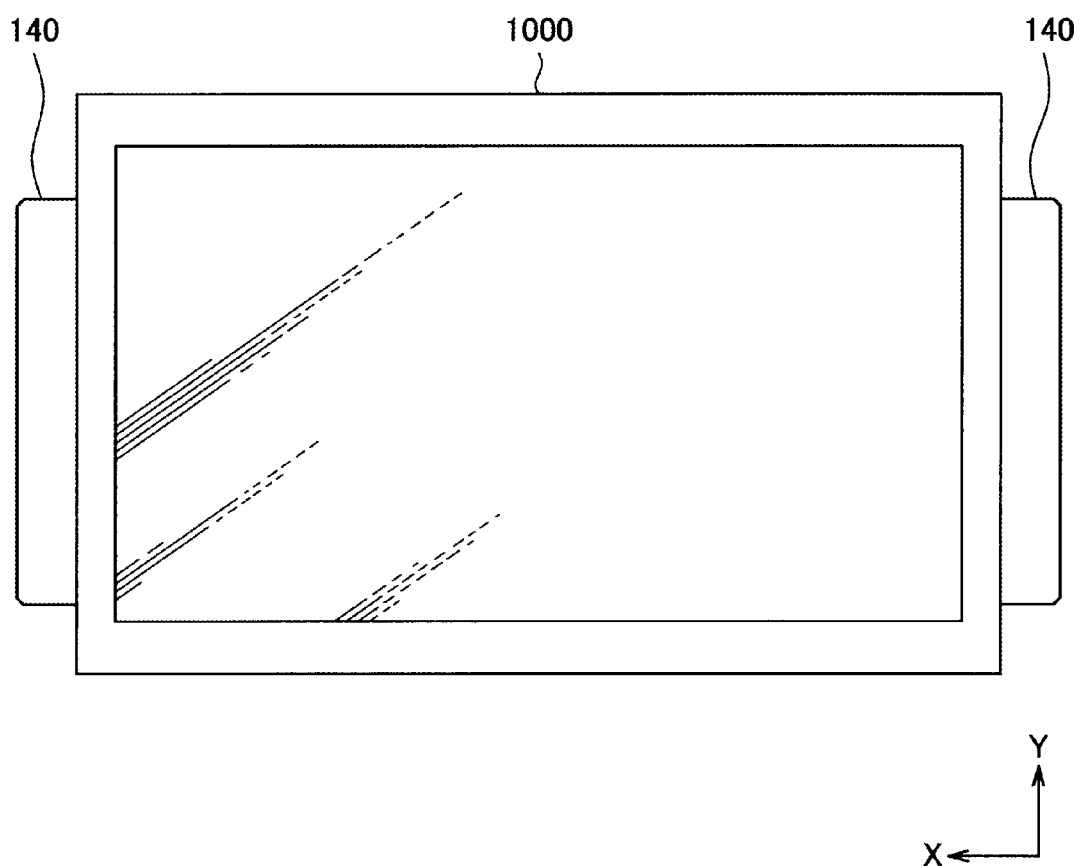
FIG. 3 is an illustration for explaining a display to which the speaker mounting member for a display apparatus according to the first embodiment is attached.

Next, with reference to FIG. 3, a condition of the front surface of the display apparatus 1000 (or the display apparatus 2000, hereinafter the same) when the speaker mounting member 100 for a display apparatus is attached to the display apparatus 1000 will be described. FIG. 3 is an illustration showing a front surface of the display apparatus 1000 to which the speaker mounting member 100 for a display apparatus is attached.

When a user watches a TV program on the display apparatus 1000 to which the speaker mounting member 100 for a display apparatus is attached, the user sees only the speaker mounting panels 140, but does not see the other members of the speaker mounting member 100 for a display apparatus. When the user mounts a speaker (not shown in the figures, hereinafter the same) is mounted on the speaker mounting panel 140, the speaker mounting panel 140 may be seen behind the speaker depending on the size of the speaker. Considering that visual information other than the display screen is desired to be fewer when the user watches a TV program, or that a highly visible speaker mounting panel 140 is not a beautiful appearance, the speaker mounting panel 140 is desired to be formed of a transparent material. As the above transparent material, an ordinary thermoplastic synthetic resin or an ordinary thermosetting synthetic resin can be used, and specifically various resins including polyurethane, polystyrene, polyacrylic acid, polycarbonate, polyvinyl chloride, and the like can be used.

Since the end of the movable member 13 extends so as to protrude from the outer frame of the display apparatus 1000, when the user watches a TV program on the display apparatus 1000, the user may see the movable member 130. Therefore, for the same reason described above, considering that visual information other than the display screen is desired to be fewer when the user watches a TV program, or that a highly visible speaker mounting panel 130 is not a beautiful appearance, the movable member 130 may also be formed of a transparent material. The transparent material used for the movable member 130 may be synthetic resins described above or the like.

The description continues with reference to FIG. 1 again. The fixing member 150 and the linking member 120 sandwich the movable member 130, and fix the position of the movable member 130. Two fixing members 150 are arranged on each linking member 120 at both ends of the linking member 120 in the X direction. The fixing member 150 is formed to have an opening facing the display apparatus 1000, or more specifically facing the negative direction of Z axis. The width of the opening of the fixing member 150 is a little larger than the width of the linking member 120 in the Y direction, so that the fixing member 150 can be engaged with the linking member 120. Therefore, the linking member 120 and the movable member 130 can be stably linked. As a result, the speaker mounted on the display apparatus 1000 is difficult to be displaced even when vibration occurs. Regarding the fixing method, a method can be used in which a screw is inserted from a through-hole included in the fixing member 150 and engaged with a guide groove included in the movable member 130 to be fixed. The detailed description about the fixing method will be described below with reference to FIG. 8 or the like based on a description of the detailed structure of each member.

The user can attach a wall-hanging member 10 to the speaker mounting member 100 for a display apparatus. Specifically, the wall-hanging member 10 can be attached to the mounting plate 110. The wall-hanging member 10 includes a hook section 12, a wall-hanging main body 14, a flat surface 16, and screws 20. The hook section 12 is arranged in the wall-hanging main body 14, and has a shape of, for example, a hook. A base bracket including a hooked section to be hooked up to the hook section 12 is attached to the wall, and by hooking up the hook section 12 to the hooked section, the speaker mounting member 100 for a display apparatus is attached to the wall. Since the screw 20 passes through the through-hole 22 included in the wall-hanging member 10 and a through-hole included in the mounting plate 110, the wall-hanging member 10 and the mounting plate 110 are tightened together with the speaker mounting member 100 for a display apparatus and attached to the display apparatus 1000. The wall-hanging main body 14 includes the flat surface 16 facing the display apparatus 1000. The fixing member 150 includes a fixing member end portion linked with the mounting plate 110, and the fixing member end portion includes a flat surface. When the wall-hanging member 10 is attached to the mounting plate 110, the flat surface included in the fixing member end portion contacts the flat surface 16 included in the wall-hanging main body 14. Specifically, the flat surface 16 shown in FIG. 1 contacts the flat surface 164 shown in FIG. 5A. Therefore, the wall-hanging member 10 is easy to be attached to the speaker mounting member 100 for a display apparatus, and the wall-hanging member 10 which has been attached is stably fixed.

So far the speaker mounting member 100 for a display apparatus according to an embodiment of the present invention which is attached to the display apparatus 1000 has been described with reference to FIGS. 1 to 3. However, the speaker mounting member 100 for a display apparatus is not limited to the above described embodiment. For example, although it has been described that the speaker mounting member 100 for a display apparatus according to the embodiment includes two mounting plates 110, the number of the mounting plates 110 may be one or more than two.

Also, although it has been described that the speaker mounting member 100 for a display apparatus according to the embodiment includes two linking members 120, the number of the linking members 120 may be one or more than two. In a similar way, although it has been described that two movable members 130 are arranged at both ends of each linking member 120 in the X direction, the number of the movable members 130 may be one. In other words, by linking the movable member 130 and the fixing member 150 with only one end of the linking member 120 in the X direction, and moving the movable member 130 linked to the one end of the linking member 120, the distance between the two speaker mounting panels 140 may be adjusted.

Furthermore, although it has been described that the speaker mounting member 100 for a display apparatus according to the embodiment includes two speaker mounting panels 140, the number of the speaker mounting panels 140 may be one. The speaker mounting panels 140 may be provided to either one of both ends of the display apparatus 1000 in the X direction.

Although, in the speaker mounting member 100 for a display apparatus according to the embodiment, it is shown that the mounting plate 110 elongated in the Y direction crosses perpendicular to, or approximately perpendicular to the linking member 120 elongated in the X direction, the crossing angle is not limited to the above. The mounting plate 110 may be arranged to be elongated in the X direction. In other words, the speakers may not be mounted on both ends of the display apparatus 1000 in the X direction, and for example, the speakers may be mounted on both ends of the display apparatus 1000 in the Y direction.

Since the length of the speaker mounting member 100 for a display apparatus can be adjusted in the X direction as described above, the speaker mounting member 100 for a display apparatus can be applied to different display apparatuses. Since the mounting position of the linking member 120 can be adjusted in the Y direction, the speaker mounting member 100 for a display apparatus can be mounted avoiding connector terminals or the like.

Next, each member included in the speaker mounting member 100 for a display apparatus according to the embodiment will be described, and configurations and functions of the members will be described in further detail.

<Members in the Speaker Mounting Member for Display Apparatus>

[2-1. Mounting Plate 110]

Figure 4:
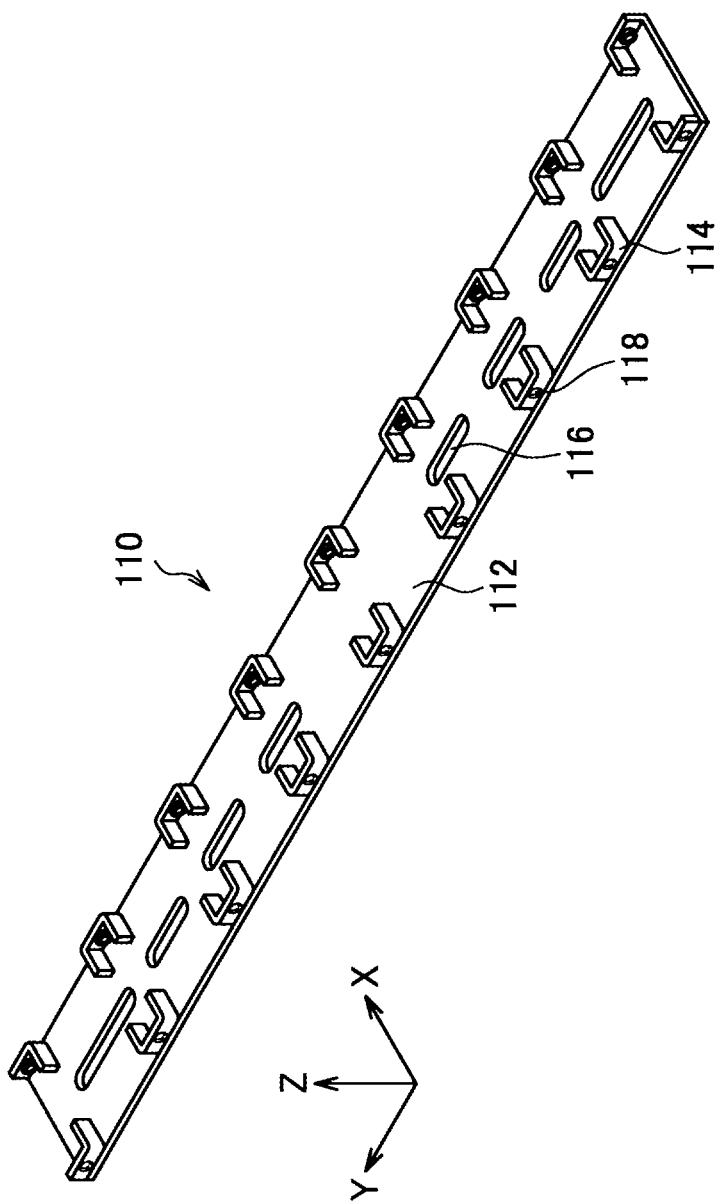
FIG. 4 is an illustration for explaining a mounting plate included in the speaker mounting member for a display apparatus according to the first embodiment.

First, the mounting plate 110 will be described with reference to FIG. 4. FIG. 4 is an illustration showing a shape of the mounting plate 110. The mounting plate 110 includes engaging portions 112, protrusion portions 114, wall-hanging member through-holes 116, and fixing member end portion through-holes 118, and is formed into a plate shape. The shape of the mounting plates 110 is not limited to the shape shown in FIG. 4, but may be, for example, a U-shape on the XY plane.

As shown in FIG. 4, the engaging portions 112 and the protrusion portions 114 are arranged alternately along the Y direction. The linking member 120 engages with the engaging portion 112. The mounting plate 110 includes a plurality of engaging portions 112, and the linking member 120 can engage with any of the engaging portions 112. Therefore, the effects described with reference to FIG. 1 can be obtained. The description continues with reference to FIG. 1 again. Since the linking member 120 can engage with any of the engaging portions 112, and the engaging portions 112 are arranged along the Y direction, the linking member 120 is linked to the mounting plate 110 so that the mounting position of the linking member 120 can be adjusted in the Y direction. Therefore, the user can adjust the position of the linking member 120 in accordance with positions of connector terminals, cables, and the like on the back surface of the display apparatus 1000, and the linking member 120 is mounted avoiding the connector terminals, the cables, and the like.

The description continues with reference to FIG. 4 again. The wall-hanging member through-hole 116 is a through-hole into which a guide member such as the screw 20 for fixing the wall-hanging member 10 is inserted. The wall-hanging member 10 includes the hook section 12, and the hook section 12 is hooked by a hooking member provided on the wall. Therefore, when the wall-hanging member 10 is attached to the wall-hanging member through-hole 116, the display apparatus 1000 is hung on the wall. Here, the wall-hanging member through-hole 116 may be compatible with VESA (Video Electronics Standards Association) standard, and a generally used wall-hanging member 10 can be attached.

Also, the wall-hanging member through-hole 116 is used for inserting a screw to fix the mounting plate 110 to the display apparatus 1000 when the display apparatus 1000 is set on a base or the like. By inserting the screw 20 into the through-hole 22 included in the wall-hanging member 10, the wall-hanging member through-hole 116, and a mounting hole included in the display apparatus 1000, the wall-hanging member 10 is fixed to the display apparatus 1000. In other words, the wall-hanging member 10 and the mounting plate 110 can be tightened together by the screw 20. Since the mounting plate 110 has a configuration as described above, when the display apparatus 1000 hung on the wall is set on a base or the like, only the wall-hanging member 10 has to be removed. In other words, without completely disassembling the speaker mounting member 100 for a display apparatus, only an operation in which the screw 20 is removed to detach the wall-hanging member 10, and the speaker mounting member 100 for a display apparatus is attached again by the screw 20 has to be performed. When hanging and using the display apparatus 1000 on the wall, any wall-hanging member 10 can be used.

The protrusion portion 114 is a protrusion formed to a squared U-shape, and the opening of the squared U-shape faces the center of the mounting plate 110 in the X direction.

The protrusion portion 114 is a portion to form the engaging portion 112, and there are pairs of protrusion portions 114, the X direction openings of which face each other. There are a plurality of protrusion portions 114 adjacent to the engaging portions 112 along the Y direction. The protrusion portion 114 includes the fixing member end portion through-hole 118. The fixing member end portion through-holes 118 are arranged along the longitudinal direction of the mounting plate 110, in other words arranged along the Y direction, and have openings facing in the X direction. The fixing member end portion through-hole 118 is a hole into which a fixing member such as a screw is inserted. By inserting a screw into the fixing member end portion through-hole 118 and a through-hole included in the fixing member 150, the fixing member 150 is linked to the mounting plate 110 so that the fixing member 150 covers the mounting plate 110. Next, how the fixing member 150 is linked to the protrusion portion 114 will be described, and then, the entire fixing member 150 will be described.

[2-2. Fixing Member 150]

Figure 5A:
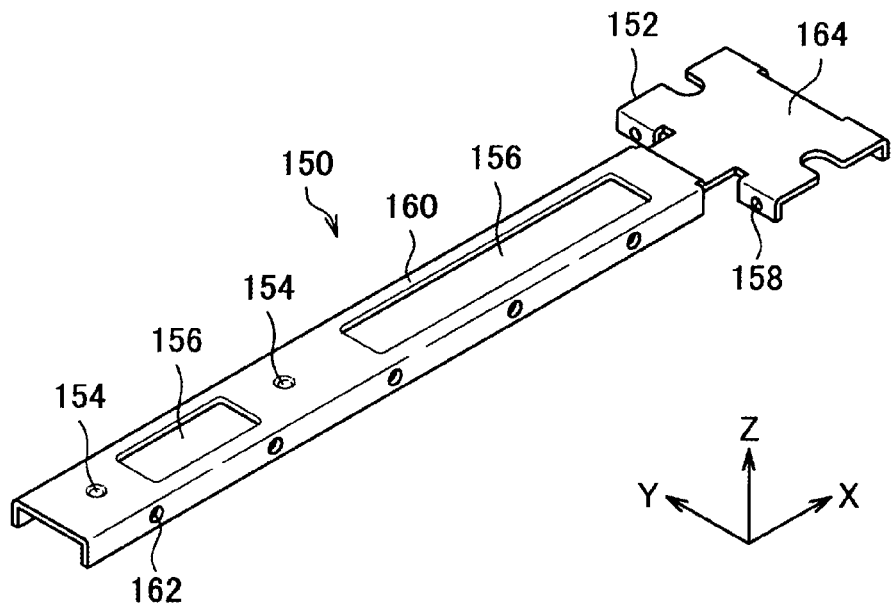
FIG. 5A is an illustration for explaining a fixing member included in the speaker mounting member for a display apparatus according to the first embodiment.
Figure 5B:
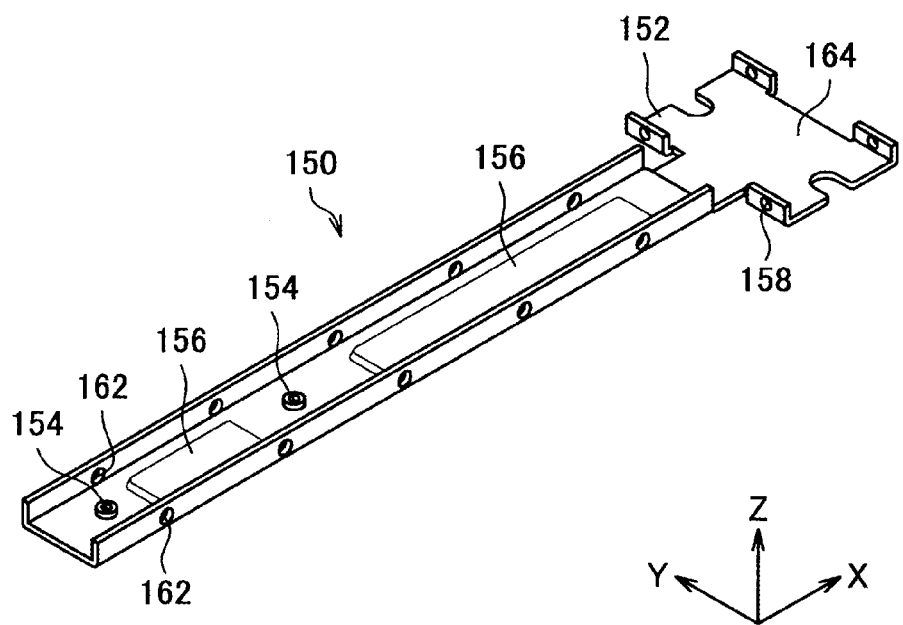
FIG. 5B is an illustration for explaining the fixing member included in the speaker mounting member for a display apparatus according to the first embodiment.

The fixing member 150 will be described with reference to FIGS. 5A and 5B. FIG. 5A is an illustration showing a shape of the fixing member 150 from a point of view. FIG. 5B is an illustration showing the shape of the fixing member 150 from a point of view different from that of FIG. 5A. The fixing member 150 includes a fixing member end portion 152, a movable member through-hole 154, a contact portion 156, a mounting plate through-hole 158, a fixing member main body 160, a linking member through-hole 162, and a flat surface 164. One of Z direction surfaces of the fixing member 150 has an opening. The shape of the fixing member 150 is not limited to the shape shown in FIGS. 5A and 5B, and may be any shape if the fixing member 150 can be connected to the mounting plate 110, the linking member 120, and the movable member 130.

The fixing member end portion 152 includes the mounting plate through-hole 158. A fixing member such as a screw can be inserted into the mounting plate through-hole 158, so that the fixing member 150 can be linked and fixed to the mounting plate 110 by inserting the screw into the wall-hanging member through-hole 116 of the mounting plate 110 described with reference to FIG. 4.

The fixing member end portion 152 has a flat surface 164 parallel to the XY plane in a state shown in FIG. 5A. Therefore, as described with reference to FIG. 4, when the wall-hanging member 10 is attached to the mounting plate 110, the flat surface 16 included in the wall-hanging main body 14 contacts the flat surface 164 included in the fixing member end portion 152, so that the wall-hanging member 10 is stably attached. As a result, the wall-hanging member 10 having been attached to the wall is fixed in a stable condition.

The linking member through-hole 162 is a hole into which a fixing member such as a screw is inserted, and a guide member penetrates a through-hole included in the linking member 120. Therefore, the fixing member 150 and the linking member 120 are linked to each other.

Figure 6A:
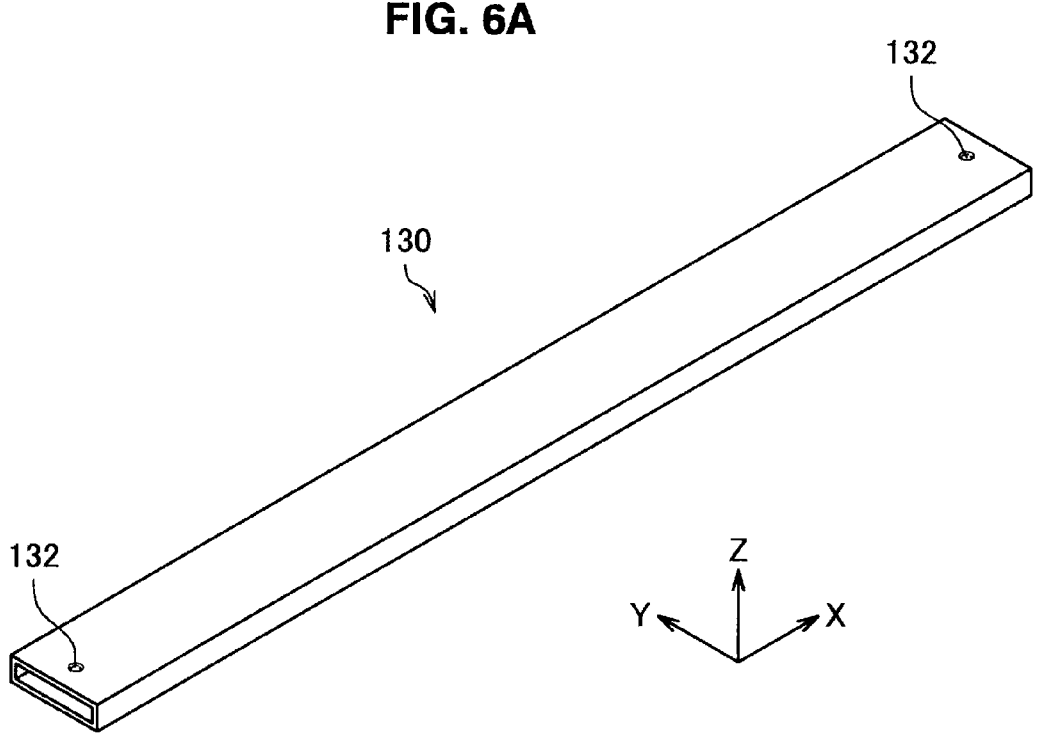
FIG. 6A is an illustration for explaining a movable member included in the speaker mounting member for a display apparatus according to the first embodiment.
Figure 6B:
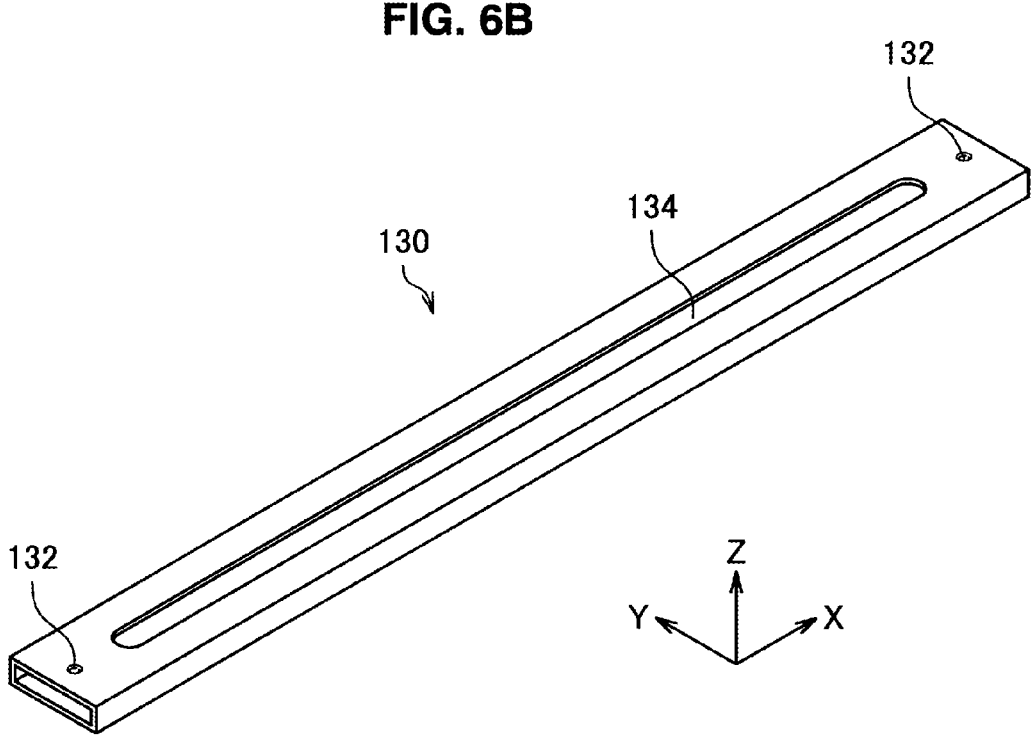
FIG. 6B is an illustration for explaining the movable member included in the speaker mounting member for a display apparatus according to the first embodiment.
Figure 6C:
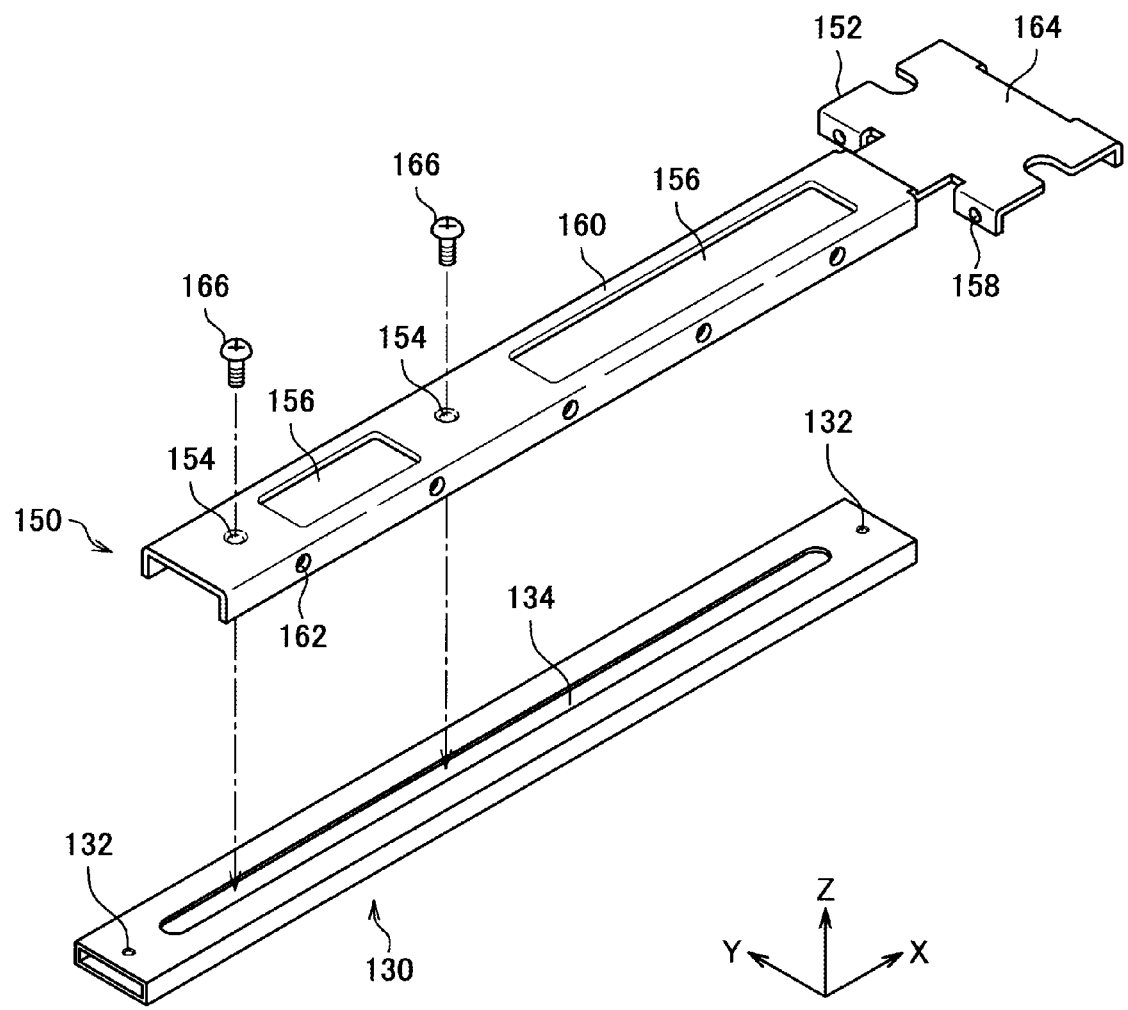
FIG. 6C is an illustration for explaining a condition in which the movable member and the fixing member included in the speaker mounting member for a display apparatus according to the first embodiment are linked with each other.

The movable member through-hole 154 is a hole into which a guide member such as a screw is inserted, and the guide member penetrates a guide groove 134 included in the movable member 130 shown in FIG. 6B or the like. The width of the opening portion of the fixing member main body 160 is a little larger than the width of the movable member 130, so that the fixing member 150 can engage with the movable member 130. Therefore, as the fixing member main body 160 covers the movable member 130, the fixing member 150 and the linking member 130 are fixed together. As described above, the fixing member 150 is stably linked to the movable member 130 by the guide member, the speaker mounted on the display apparatus 1000 is difficult to be displaced even when vibration occurs.

When the movable member 130 and the fixing member 150 are linked together, the contact portion 156 contacts the movable member 130. Therefore, the movable member 130 is made stable by the contact portion 156, and stably attached. As a result, the speaker mounted on the display apparatus 1000 is difficult to be displaced even when vibration occurs.

Next, a functional configuration of the guide groove 134 included in the movable member 130 as described above will be described, and then a functional configuration of the movable member 130 will be described in further detail with reference to FIGS. 6A and 6B. In addition, with reference to FIG. 6C, a condition in which the fixing member 150 is linked to the movable member 130 will be described.

[2-3. Movable Member 130]

FIG. 6A is an illustration showing a shape of the movable member 130 from a point of view. FIG. 6B is an illustration showing the shape of the movable member 130 from a point of view different from that of FIG. 6A. As shown in FIG. 6B, the movable member 130 includes the through-hole 132 and the guide groove 134. The movable member 130 has, for example, a generally rectangular solid shape, and is formed into a tube shape.

The guide groove 134 is a groove with which a guide member 166 such as a screw engages. Here, with reference to FIG. 6C, a condition in which the movable member 130 is linked to the fixing member 150 will be described. The width of the guide groove 134 and the diameter of the movable member through-hole 154 are formed so that the guide member 166 can penetrate the guide groove 134 and the movable member through-hole 154. Therefore, by inserting the guide member 166 from the movable member through-hole 154 included in the fixing member 150, and fixing the guide member 166 in the guide groove 134, the movable member 130 and the fixing member 150 can be fixed together. The guide member 166 guides the position adjustment of the movable member 130, and there are two movable member through-holes 154 in the X direction. The movable member 130 can move in the X direction. As described above, there are two guide members 166 which penetrate the movable member through-holes 154, and the guide members 166 engage with the guide groove 134, so that the guide members 166 guide the movable member 130 not to move in the Y direction when the movable member 130 moves in the X direction. Since two guide members 166 are inserted into the guide groove 134, the two guide members 166 prevent the movable member 130 from getting out of the fixing member 150 and the linking member 120, and getting into the inside of the fixing member 150 and the linking member 120. When the guide member 166 is not penetrated and fixed in the guide groove 134 and the movable member through-hole 154, the movable member 130 can be position-adjusted in the X direction while the movable member 130 is engaged with the fixing member 150. The guide groove 134 is formed to be elongated in the X direction of the movable member 130, which is its longitudinal direction, and the user can fix the guide member 166 at an arbitrary position. In other words, as described with reference to FIGS. 1 and 2, the movable member 130 can be arranged to be movable in the X direction of FIGS. 1 and 2.

The description continues with reference to FIGS. 6A and 6B again. The through-hole 132 is located near the end portion in the X direction of the movable member 130, in other words, near the end portion in the longitudinal direction of the movable member 130. The through-hole 132 is a hole into which a fixing member such as a screw is inserted, and the fixing member penetrates a through-hole included in the speaker mounting panel 140. As shown in FIG. 6A, the movable member 130 may include two through-holes 132, or may include only one through-hole 132. When the movable member 130 includes two through-holes 132, one of the through-holes 132 becomes a hole into which the fixing member for fixing the speaker mounting panel 140 is inserted.

The movable member 130 is sandwiched by the linking member 120 and the fixing member 150, and fixed. How the movable member 130 is fixed will be described in detail, while the functional configuration of the linking member 120 will be more specifically explained.

[2-4. Linking Member 120]

The linking member 120 will be described with reference to FIG. 7. FIG. 7 is an illustration showing a shape of the linking member 120. The linking member 120 includes a fixing member main body through-hole 122 and a linking member main body 124. The cross-sectional shape of the linking member main body 124 of the linking member 120 in the YZ plane is formed into a squared U-shape, and has an opening facing in the Z direction.

The fixing member main body through-hole 122 is a hole into which a fixing member such as a screw is inserted, and the fixing member penetrates the linking member through-hole 162 included in the fixing member 150. Therefore, the linking member 120 and the fixing member 150 are linked to each other and fixed. The linking member main body 124 of the linking member 120 is engaged with the engaging portion 112 of the mounting plate 110 described with reference to FIG. 4. There are a plurality of engaging portions 112 in the Y direction, and the linking member main body 124 can be engaged with any of the engaging portions 112. In this way, the linking member 120 is linked to the mounting plate 110 so that the mounting position of the linking member 120 can be adjusted in the Y direction. Therefore, the position of the linking member 120 is adjusted in accordance with positions of connector terminals and cables (not shown in the figures) on the back surface of the display apparatus 1000. As a result, the linking member 120 is mounted avoiding the connector terminals or the like.

A plurality of fixing member main body through-holes 122 are provided in the linking member 120, and a plurality of linking member through-holes 162 are also provided in the fixing member 150 described with reference to FIGS. 5A and 5B. Therefore, by adjusting the positions of the linking member 120 and the fixing member 150 using any one of the fixing member main body through-holes 122 and any one of the linking member through-holes 162 and fixing them using a fixing member such as a screw, the mounting position of the fixing member 150 with respect to the linking member 120 can be adjusted in the X direction. The movable member 130 described with reference to FIGS. 6A and 6B can be moved in the X direction in the linking member main body 124, and is sandwiched at a predetermined position by the linking member main body 124 and the fixing member main body 160, so that the position is fixed. Therefore, as described with reference to FIGS. 1 and 2, the position of the movable member 130 in the X direction with respect to the linking member 120 can be adjusted. In this way, by adjusting the positions of the movable member 130 and the fixing member 150 in the X direction with respect to the linking member 120, the speaker mounting member 100 for a display apparatus can be attached to the display apparatuses 1000 and 2000 which have different sizes.

[2-5. Condition in which the Linking Member 120 and the Fixing Member 150 are Linked Together]

Figure 8:
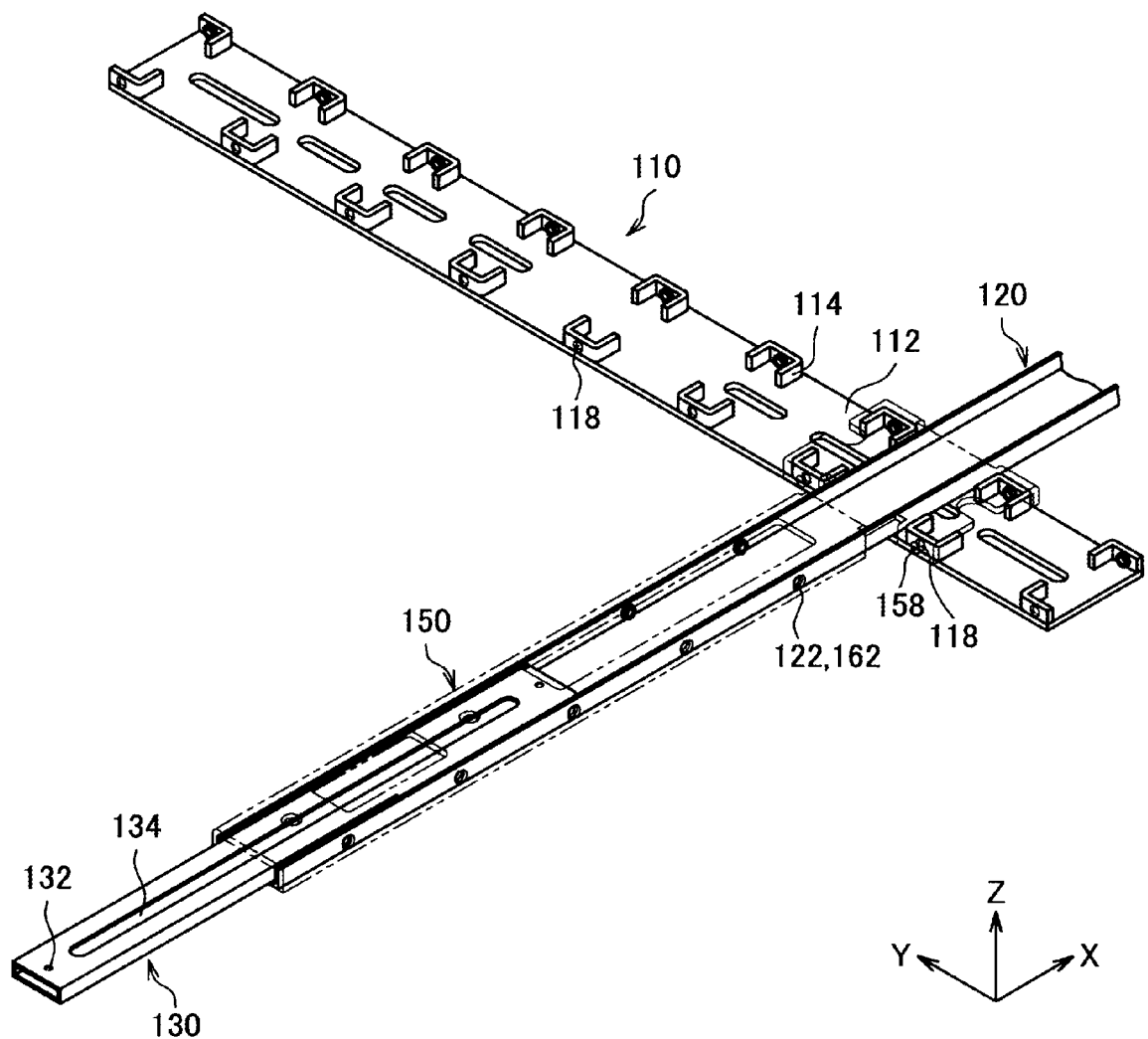
FIG. 8 is an illustration for explaining a condition in which the linking member and the movable member included in the speaker mounting member for a display apparatus according to the first embodiment are linked with each other.

Next, with reference to FIG. 8, the conditions of the linking member 120 and the movable member 130 which have not been specifically described in FIGS. 1 and 2 due to the existence of the fixing member 150 will be described. FIG. 8 is an illustration for explaining a condition in which the linking member 120 and the fixing member 150 are linked together, and the fixing member 150 is represented by dashed lines in the illustration. In other words, FIG. 8 shows parts of the linking member 120 and the movable member 130 which are covered by the fixing member 150.

The linking member 120 is engaged with the engaging portion 112 included in the mounting plate 110. As described above, the fixing member 150 represented by dashed lines is fixed to the mounting plate 110 so that the fixing member 150 covers the protrusion portions 114 included in the mounting plate 110. Since, in standards such as the VESA standard for display apparatus, a plurality of hole positions into which a fixing member such as a screw is inserted are allowed, the mounting position of the mounting plate 110 in the X direction may vary depending on each display apparatus. Even in such a case, since a plurality of linking member through-holes 162 and a plurality of fixing member main body through-holes 122 are provided in the fixing member 150 and the linking member 120 respectively, the fixing member 150 can be moved freely in the X direction in accordance with the mounting position of the mounting plate 110 to be linked to the linking member 120. Therefore, the position of the fixing member 150 can be adjusted to a position in which the flat surface 164 covers the engaging portion 112, so that the fixing member 150 can be stably attached to the mounting plate 110. In this way, the speaker mounting member 100 for a display apparatus can be stably attached to a display apparatus independent of the position into which a fixing member such as a screw is inserted or the size of the display apparatus.

On the other hand, the linking member 120 is linked to the mounting plate 110 so that the mounting position of the linking member 120 can be adjusted in the Y direction. Therefore, the position of the linking member 120 can be adjusted in accordance with positions of connector terminals, cables, and the like on the back surface of the display apparatus 1000. As a result, the linking member 120 is mounted avoiding the connector terminals or the like.

[2-6. Speaker Mounting Panel 140]

Figure 9:
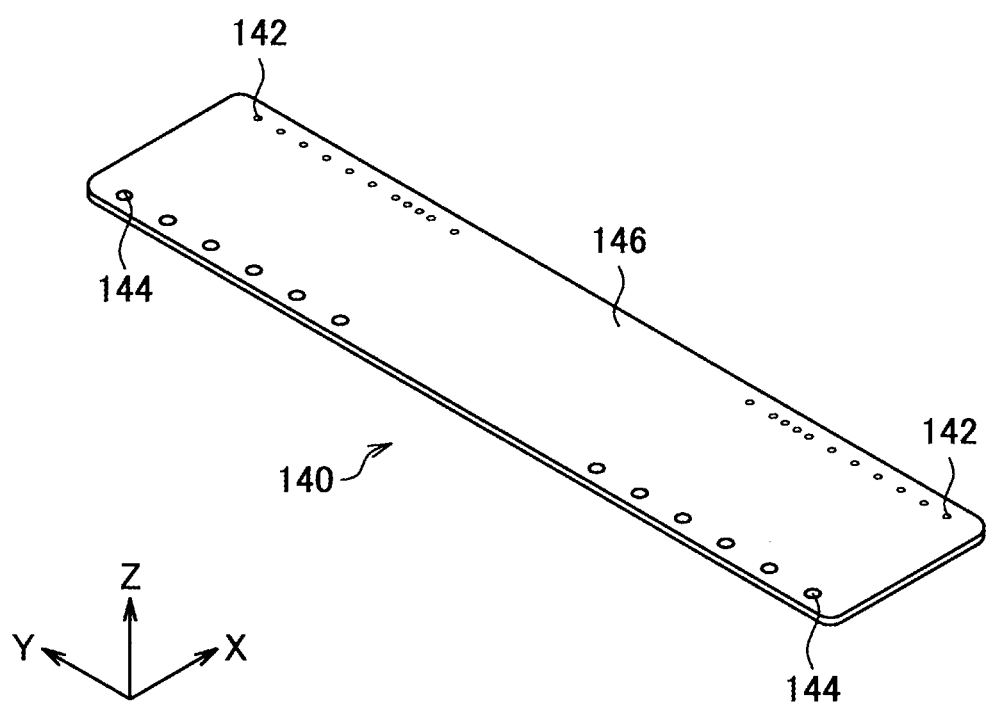
FIG. 9 is an illustration for explaining a speaker mounting member for display included in the speaker mounting member for a display apparatus according to the first embodiment.

Next, the speaker mounting panel 140 will be described with reference to FIG. 9. FIG. 9 is an illustration showing a shape of the speaker mounting panel 140. The speaker mounting panel 140 includes through-holes 142, through-holes 144, and a speaker mounting panel main body 146. As shown in FIG. 9, the speaker mounting panel 140 is formed into a plate having a bottom surface of generally rectangular shape. However, the speaker mounting panel 140 is not limited to have a generally rectangular solid shape, but may have any shape on which a speaker can be mounted.

The through-hole 144 is a hole into which a guide member such as a screw is inserted in order to mount a speaker. As shown in FIG. 9, the speaker mounting panel 140 may have a plurality of through-holes 144, or may have a single through-hole 144. A user can attach a speaker to the speaker mounting panel main body 146. Since a plurality of through-holes 144 are arranged in the Y direction, the user can attach the speaker to any position in the Y direction of the speaker mounting panel main body 146 in accordance with the user's preference.

The through-hole 142 is a hole into which a guide member such as a screw is inserted. The guide member inserted into the through-hole 132 included in the movable member 130 described in FIGS. 6A and 6B is inserted into the through-hole 142, so that the movable member 130 and the speaker mounting panel 140 are linked together and fixed. Since there are a plurality of through-holes 142 in the Y direction, the position to which the speaker mounting panel 140 is attached to the movable member 130 can be adjusted in the Y direction. Since the position of the linking member 120 which engages with the engaging portion 112 can be adjusted in the Y direction as described above, and accordingly the position of the movable member 130 is adjusted, the position to which the speaker mounting panel 140 is attached can be adjusted in accordance with the Y direction adjustment of the movable member 130. On the other hand, the position in which the speaker mounting panel 140 is attached to the movable member 130 can be adjusted in the Z direction. The method of the adjustment will be described with reference to FIGS. 10A and 10B.

[2-7. Condition in which the Speaker Mounting Panel 140 is Attached to the Movable Member 130]

Figure 10A:
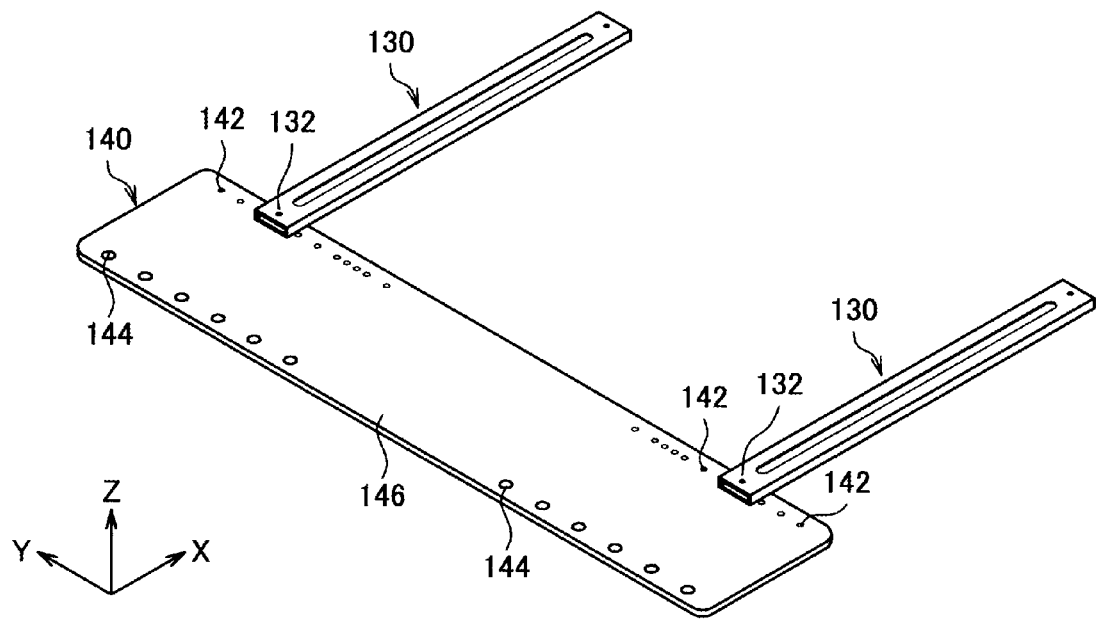
FIG. 10A is an illustration for explaining a condition in which the speaker mounting member for display and the movable member included in the speaker mounting member for a display apparatus according to the first embodiment are linked with each other.
Figure 10B:
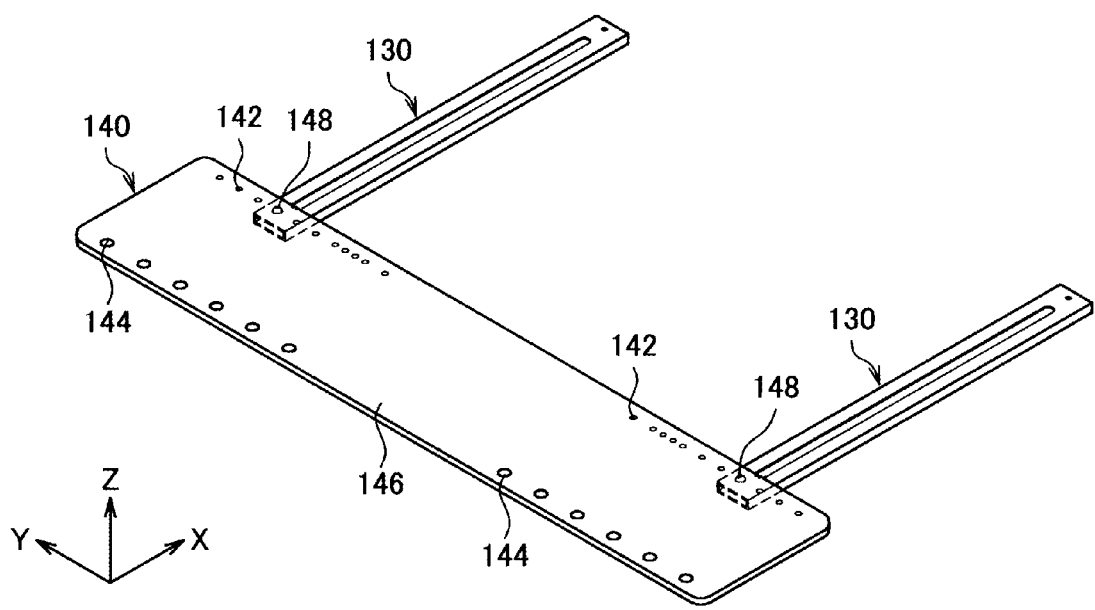
FIG. 10B is an illustration for explaining a condition in which the speaker mounting member for display and the movable member included in the speaker mounting member for a display apparatus according to the first embodiment are linked with each other.
Figure 10C:
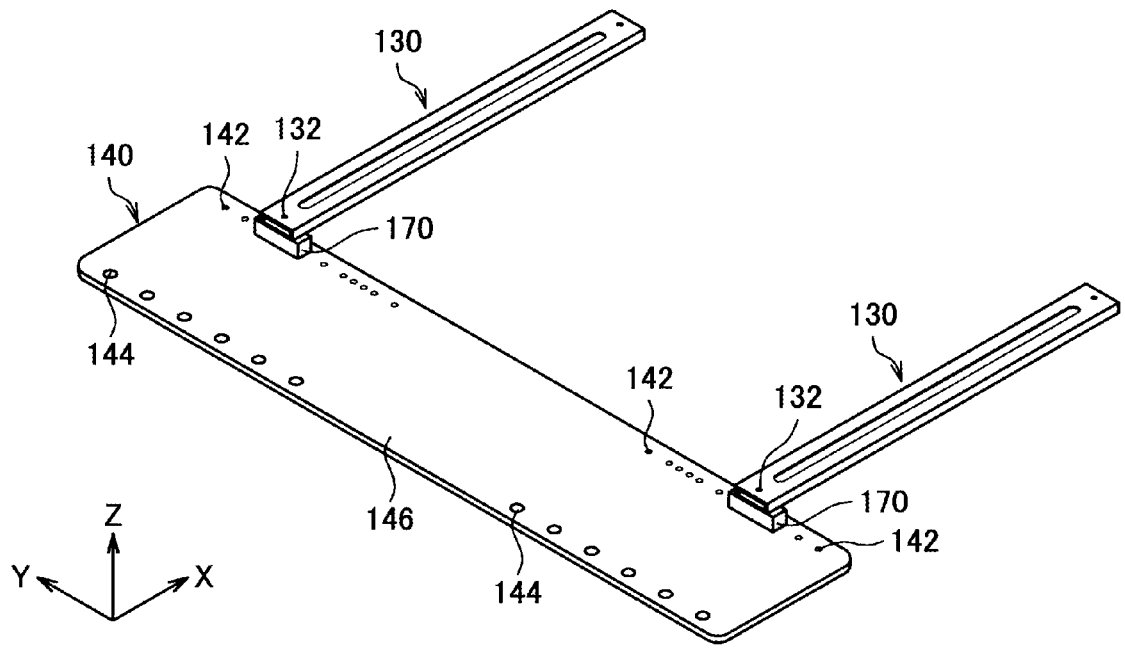
FIG. 10C is an illustration for explaining a condition in which the speaker mounting member for display and the movable member included in the speaker mounting member for a display apparatus according to the first embodiment are linked with each other.
Figure 10D:
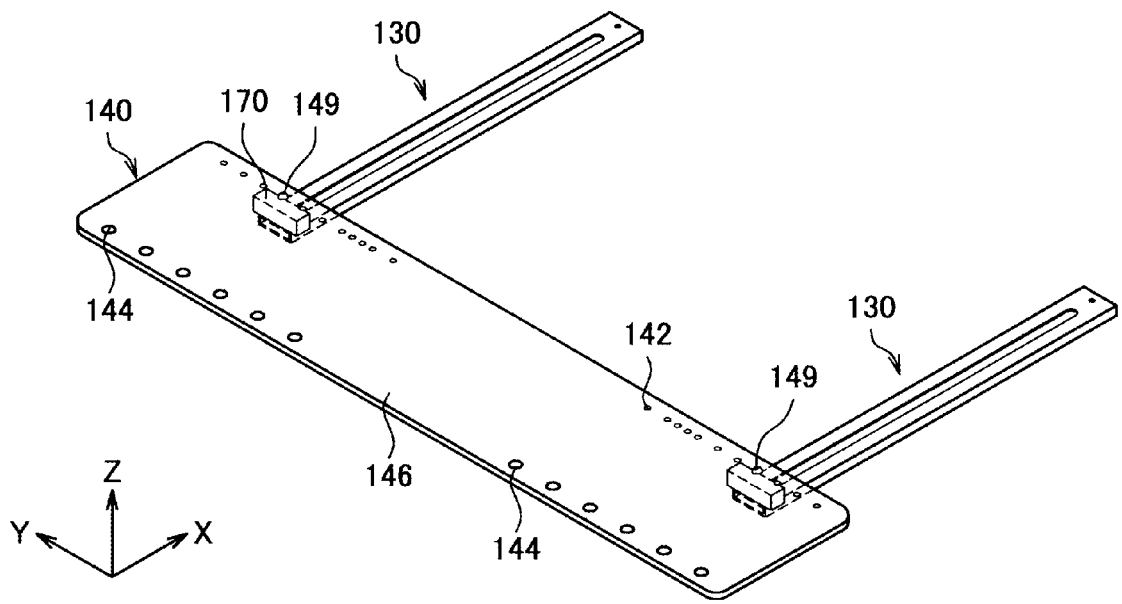
FIG. 10D is an illustration for explaining a condition in which the speaker mounting member for display and the movable member included in the speaker mounting member for a display apparatus according to the first embodiment are linked with each other.

A condition in which the speaker mounting panel 140 is attached to the movable member 130 will be described with reference to FIGS. 10A, 10B, 10C, and 10D. FIG. 10A is an illustration showing a condition in which the speaker mounting panel 140 is attached to the movable member 130 so that the speaker mounting panel 140 is positioned on the side of the display apparatus 1000 (not shown in FIG. 10A) with respect to the movable member 130, in other words, on the negative direction side of the Z axis. FIG. 10B is an illustration showing a condition in which the movable member 130 is attached so that the movable member 130 is positioned on the side of the display apparatus 1000 (not shown in FIG. 10B) with respect to the speaker mounting panel 140, in other words, on the negative direction side of the Z axis. FIG. 10C is an illustration showing a condition in which the speaker mounting panel 140 is attached so that the speaker mounting panel 140 is positioned on the negative direction side of the Z axis with respect to the movable member 130, and a panel position adjustment member 170 is included between the movable member 130 and the speaker mounting panel 140. FIG. 10D is an illustration showing a condition in which the movable member 130 is attached so that the movable member 130 is positioned on the negative direction side of the Z axis with respect to the speaker mounting panel 140, and a panel position adjustment member 170 is included between the movable member 130 and the speaker mounting panel 140.

As shown in FIG. 10A, the speaker mounting panel 140 may be arranged to be positioned on the side of the display apparatus 1000 with respect to the movable member 130. The speaker mounting panel 140 is fixed by inserting the guide member 148 into the through-hole 142. As shown in FIG. 10C, the panel position adjustment member 170 having an arbitrary size may be arranged between the movable member 130 and the speaker mounting panel 140. The panel position adjustment member 170 has, for example, a rectangular solid shape, and it is possible to adjust the mounting position of the speaker mounting panel 140 in the Z direction by the thickness of the panel position adjustment member 170 in the Z direction. The panel position adjustment member 170 is fixed by inserting a fixing member 149 such as a screw into a through-hole included in the panel position adjustment member 170. Therefore, when the user watches a TV program on the display apparatus 1000 while the speaker is mounted, the user can watch the TV program in a condition in which the speaker is moved nearer to the user in accordance with the user's preference. For example, the position of the speaker in the Z direction can be adjusted so that the speaker is not arranged in a position extremely projecting from the display apparatus 1000 in the Z direction or a position extremely retracting from the display apparatus 1000 in the Z direction in accordance with the shape of the speaker or the like.

On the other hand, as shown in FIG. 10B, the movable member 130 may be arranged to be positioned on the side of the display apparatus 1000 with respect to the speaker mounting panel 140. The speaker mounting panel 140 is fixed by inserting the fixing member 148 such as a screw into the through-hole 142. As shown in FIG. 10D, the panel position adjustment member 170 may be arranged between the movable member 130 and the speaker mounting panel 140. The panel position adjustment member 170 is fixed by inserting the fixing member 149 such as a screw into a through-hole included in the panel position adjustment member 170. Therefore, when the user watches a TV program on the display apparatus 1000 while the speaker is mounted, the user can watch the TV program in a condition in which the speaker is moved farther from the user in accordance with the user's preference. For example, the position of the speaker in the Z direction can be adjusted so that the speaker is not arranged in a position extremely projecting from the display apparatus 1000 in the Z direction or a position extremely retracting from the display apparatus 1000 in the Z direction in accordance with the shape of the speaker or the like. As described with reference to FIGS. 10A, 10B, 10C, and 10D, the user can adjust the position of the speaker in the Z direction with respect to the display apparatus 1000 in accordance with the user's preference.

<3. Summary>

Finally, a functional configuration of the speaker mounting member for a display apparatus of the embodiment and a functional effect obtained from the functional configuration will be briefly summarized.

First, the functional configuration of the speaker mounting member 100 for a display apparatus of the embodiment can be represented as below. The speaker mounting member 100 for a display apparatus includes the mounting plate 110, the linking member 120, the movable member 130, and the speaker mounting panel 140. One or plurality of the mounting plates 110 are laid on the back surface of the display apparatus 1000. The linking member 120 is crosswise linked to the mounting plate 110 at a predetermined position in a first direction along the longitudinal direction of the mounting plate 110. The movable member 130 is linked to the linking member 120 movably along a second direction perpendicular to the first direction. The speaker mounting panel 140 is attached to the movable member 130, and a speaker can be mounted on the speaker mounting panel 140. In this way, since the movable member 130 is linked to the linking member 120 movably along the second direction, the user can arrange the speaker in various positions in the second direction in accordance with the size of the display apparatus 1000 and the user's preference.

Since the linking member 120 is linked to the mounting plate 110 so that the mounting position of the linking member 120 can be adjusted in the first direction, the position of the linking member 120 can be adjusted in accordance with positions of connector terminals or the like on the back surface of the display apparatus 1000. As a result, the linking member 120 is mounted avoiding the connector terminals or the like. Since the speaker mounting member 100 for a display apparatus has a configuration as described above, the length of the speaker mounting member 100 for a display apparatus can be adjusted in the first direction, and the speaker mounting member 100 for a display apparatus can be applied to different display apparatuses.

The functional configuration of the speaker mounting member 100 for a display apparatus of the embodiment may further include the fixing member 150. The fixing member 150 and the linking member 120 sandwich the movable member 130, and fix the position of the movable member 130. Since the fixing member 150 and the linking member 120 sandwich the movable member 130, and fix the position of the movable member 130 as described above, the linking member 120 and the movable member 130 are stably linked to each other. As a result, the speaker mounted on the display apparatus 1000 is difficult to be displaced even when vibration occurs.

In the functional configuration of the speaker mounting member 100 for a display apparatus of the embodiment, further, the mounting plate may include the engaging portion 112. A plurality of engaging portions 112 are arranged in the first direction, and the linking member 120 passes through the engaging portion 112 of a predetermined position along the second direction. As described above, since the linking member 120 can pass through a plurality of engaging portions 112, the position of the linking member 120 can be adjusted in accordance with positions of connector terminals or the like. As a result, the linking member 120 is mounted avoiding the connector terminals or the like.

In the functional configuration of the speaker mounting member 100 for a display apparatus of the embodiment, further, the movable member 130 may include the guide groove 134, and the fixing member 150 may include the movable member through-hole 154. The guide groove 134 is formed along the second direction, and a plurality of movable member through-holes 154 are formed along the second direction. A screw penetrating the movable member through-hole 154 engages with the guide groove 134. Therefore, the speaker can be fixed in various positions in the second direction in accordance with the size of the display apparatus 1000 and the user's preference, and the speaker mounted on the display apparatus 1000 is difficult to be displaced even when vibration occurs.

In the functional configuration of the speaker mounting member 100 for a display apparatus of the embodiment, further, the fixing member 150 may include a first flat surface. When the wall-hanging member 10 including the hook section 12 for attaching the wall-hanging member 10 to the wall and the wall-hanging main body 14 having a second flat surface contacting the display apparatus 1000 is fixed to the mounting plate 110, the first flat surface and the second flat surface contact each other. Therefore, the wall-hanging member 10 can be stably attached to the mounting plate 110. As a result, the speaker mounted on the display apparatus 1000, which is attached to the wall, is difficult to be displaced even when vibration occurs.

In the functional configuration of the speaker mounting member 100 for a display apparatus of the embodiment, the speaker mounting panel 140 may be formed of a transparent material. Therefore, when a user attaches the speaker to the speaker mounting panel 140 and watches a TV program on the display apparatus 1000, the annoyance that the speaker mounting panel 140 behind the speaker comes into view is removed. In other words, the speaker mounting panel 140 is low profile, so that a good aesthetic appearance of the display apparatus 1000 and the speaker is obtained.

The functional configuration of the speaker mounting member 100 for a display apparatus of the embodiment may include functions as described below. The speaker mounting panel 140 may be able to be attached to both surfaces of the movable member 130 in a third direction perpendicular to both the first direction and the second direction. As a result, the user can adjust the position of the speaker in the third direction with respect to the display apparatus 1000 in accordance with the user's preference. For example, the position of the speaker in the third direction can be adjusted so that the speaker is not arranged in a position extremely projecting from the display apparatus 1000 in the third direction or a position extremely retracting from the display apparatus 1000 in the third direction in accordance with the shape of the speaker or the like.

The functional configuration of the speaker mounting member 100 for a display apparatus of the embodiment may further include the panel position adjustment member. The panel position adjustment member is arranged between the movable member 130 and the speaker mounting panel 140. As a result, the user can adjust the position of the speaker in the third direction with respect to the display apparatus 1000 in accordance with the user's preference. For example, the position of the speaker in the third direction can be adjusted so that the speaker is not arranged in a position extremely projecting from the display apparatus 1000 in the third direction or a position extremely retracting from the display apparatus 1000 in the third direction in accordance with the shape of the speaker or the like.

In the functional configuration of the speaker mounting member 100 for a display apparatus of the embodiment, the fixing member 150 may further include the contact portion 156. The contact portion 156 is formed to protrude to the movable member 130, and contacts at least the movable member 130. Therefore, the movable member 130 is attached stably. As a result, the speaker mounted on the display apparatus 1000 is difficult to be displaced even when vibration occurs.

It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-65147 filed in the Japan Patent Office on 17 Mar. 2009, the entire content of which is hereby incorporated by reference.

What is claimed is:

1. A speaker mounting member for a display apparatus, the speaker mounting member comprising:
   one or a plurality of mounting plates configured to be laid on a back surface of the display apparatus;
   a linking member configured to be crosswise linked to a mounting plate of the one or the plurality of mounting plates at a predetermined position in a first direction along a longitudinal direction of the mounting plate;
   a movable member configured to be linked to the linking member movably along a second direction perpendicular to the first direction;
   a fixing member configured to fix a position of the movable member by sandwiching the movable member between the fixing member and the linking member, the movable member being located within a volume of space that is defined between the fixing member and the linking member such that the fixing member is on a first side of the movable member, and the linking member is on a second side of the movable member; and
   a speaker mounting panel configured to be attached to the movable member and to be able to mount a speaker.

2. The speaker mounting member for a display apparatus according to claim 1, wherein:
   the mounting plate includes a plurality of engaging portions arranged in the first direction, and the linking member engages with an engaging portion of the plurality of engaging portions of a predetermined position along the second direction.

3. The speaker mounting member for a display apparatus according to claim 1, wherein:

the movable member includes a guide groove formed along the second direction, the fixing member is arranged along the second direction and includes a plurality of through-holes into which guide members guiding a movement of the movable member penetrate, and the guide members penetrating into the plurality of through-holes engage with the guide groove.

4. The speaker mounting member for a display apparatus according to claim 1, wherein:

the fixing member includes a first flat surface, and when a wall-hanging member including a hook section configured to hook and fix the display apparatus on a wall and a wall-hanging main body having a second flat surface is fixed to the mounting plate, the first flat surface and the second flat surface contact each other.

5. The speaker mounting member for a display apparatus according to claim 1, wherein the speaker mounting panel is formed of a transparent material.

6. The speaker mounting member for a display apparatus according to claim 1, wherein the movable member includes at least two surfaces and wherein the speaker mounting panel can be attached to either of the two surfaces of the movable member in a third direction perpendicular to both the first direction and the second direction.

7. The speaker mounting member for a display apparatus according to claim 1, further comprising a panel position adjustment member arranged between the movable member and the speaker mounting panel.

8. The speaker mounting member for a display apparatus according to claim 1, wherein:

the fixing member includes a contact portion that protrudes toward the movable member and contacts at least the movable member.

9. The speaker mounting panel of claim 1, wherein the mounting plate includes a plurality of engaging portions and a plurality of protrusion portions arranged alternately along the longitudinal direction of the mounting plate.

* * * * *